(12) United States Patent
Bonte et al.

(10) Patent No.: US 9,981,503 B2
(45) Date of Patent: May 29, 2018

(54) AGRICULTURAL MACHINE HAVING WHEELS WITH ADJUSTABLE CAMBER ANGLE

(71) Applicant: CNH Industrial America LLC, New Holland, PA (US)

(72) Inventors: Xavier G. J. M Bonte, Et Sint Kruis (NL); Stefan De Rycke, Olsene-Zulte (BE); Peter Vanhoutte, Varsenare (BE)

(73) Assignee: CNH Industrial America LLC, New Holland, PA (US)

( * ) Notice: Subject to any disclaimer, the term of this patent is extended or adjusted under 35 U.S.C. 154(b) by 0 days. days.

(21) Appl. No.: 14/890,830

(22) PCT Filed: May 13, 2014

(86) PCT No.: PCT/EP2014/059747
§ 371 (c)(1),
(2) Date: Nov. 12, 2015

(87) PCT Pub. No.: WO2014/184183
PCT Pub. Date: Nov. 20, 2014

(65) Prior Publication Data
US 2016/0081259 A1    Mar. 24, 2016

(30) Foreign Application Priority Data

May 14, 2013   (BE) .................................. 2013/0342

(51) Int. Cl.
*B60B 35/10*      (2006.01)
*A01B 63/00*     (2006.01)
(Continued)

(52) U.S. Cl.
CPC ............ *B60B 35/10* (2013.01); *A01B 63/006* (2013.01); *B60B 35/1009* (2013.01); *B60B 35/109* (2013.01); *B60B 35/1018* (2013.01); *A01B 73/00* (2013.01); *A01D 67/00* (2013.01); *A01F 15/00* (2013.01); *A01F 15/08* (2013.01); *B60B 2310/305* (2013.01); *B60B 2320/10* (2013.01);
(Continued)

(58) Field of Classification Search
CPC . B60B 35/10; B60B 35/1009; B60B 35/1018; B60B 35/1072; B60B 35/109; A01B 63/006
USPC .................................................. 301/128, 130
See application file for complete search history.

(56) References Cited

U.S. PATENT DOCUMENTS 2,151,045 A * 3/1939 Ploehn ................ B60B 27/0026
301/128
2,750,199 A * 6/1956 Hart ...................... B60B 35/003
180/209
(Continued)

FOREIGN PATENT DOCUMENTS

DE          10034542 A1 *  1/2002    ......... B60B 35/1018
DE          10034580 A1      1/2002

*Primary Examiner* — S. Joseph Morano
*Assistant Examiner* — Scott A Browne
(74) *Attorney, Agent, or Firm* — Patrick M. Sheldrake

(57) ABSTRACT

An undercarriage for an agricultural machine includes a hollow axle, and a stub axle slidably received within the hollow axle. A lock arrangement locks a longitudinal position of the stub axle relative to the hollow axle. At least one shim is positioned at an outboard end of the hollow axle to adjust the distance between said stub axle and said hollow axle.

21 Claims, 6 Drawing Sheets

(51) Int. Cl.
*A01F 15/08* (2006.01)
*A01D 67/00* (2006.01)
*A01B 73/00* (2006.01)
*A01F 15/00* (2006.01)

(52) U.S. Cl.
CPC ..... *B60B 2900/321* (2013.01); *B60Y 2200/22* (2013.01)

(56) References Cited

U.S. PATENT DOCUMENTS

| | | | |
|---|---|---|---|
| 3,881,564 A | 5/1975 | Bass et al. | |
| 3,894,598 A * | 7/1975 | Yeou | B62D 55/084 180/9.48 |
| 3,964,565 A * | 6/1976 | Cagle | A01M 7/0082 180/21 |
| 4,040,643 A * | 8/1977 | Applequist | A01D 90/12 180/906 |
| 4,060,170 A * | 11/1977 | Walters | B60B 29/001 254/93 HP |
| 5,121,808 A * | 6/1992 | Visentini | B60B 35/003 180/435 |
| 5,326,128 A * | 7/1994 | Cromley, Jr. | B60G 3/145 180/906 |
| 5,464,243 A * | 11/1995 | Maiwald | B60B 35/1018 180/906 |
| 5,489,114 A * | 2/1996 | Ward | B60B 35/1054 180/209 |
| 6,145,610 A * | 11/2000 | Gallignani | B62D 55/084 180/9.48 |
| 6,206,125 B1 * | 3/2001 | Weddle | B60B 35/001 180/209 |
| 6,386,554 B1 * | 5/2002 | Weddle | B60G 7/006 280/124.161 |
| 7,111,854 B1 | 9/2006 | Tuthill et al. | |
| 8,398,179 B2 * | 3/2013 | Mackin | A01D 41/12 180/209 |
| 8,918,974 B2 | 12/2014 | Merrill | |
| 2008/0250984 A1 * | 10/2008 | Panzarella | A61G 3/0209 108/44 |
| 2011/0272905 A1 * | 11/2011 | MacKin | A01D 41/12 280/124.11 |

* cited by examiner

AGRICULTURAL MACHINE HAVING WHEELS WITH ADJUSTABLE CAMBER ANGLE

This application is the US National Stage filing of International Application Serial No. PCT/EP2014/059747 filed on May 13, 2014 which claims priority to Belgian Application BE2013/0342 filed May 14, 2013, each of which is incorporated herein by reference in its entirety.

BACKGROUND OF THE INVENTION

1. Field of the Invention

The present invention relates to agricultural machines, and, more particularly, to undercarriages used on such agricultural machines.

2. Description of the Related Art

Agricultural machines may be either self-propelled or towed, and may take many forms. Self-propelled agricultural machines may include tractors, combines, sprayers, windrowers, etc. Towed agricultural machines may include balers, mower-conditioners, gravity wagons, drills, planters, sprayers, etc.

Agricultural balers, as mentioned above, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

Agricultural balers typically include at least a pair of ground engaging wheels, and may also include additional wheels (e.g., 4 wheels total), depending on the size of the baler. Depending on how the baler is hitched to the prime mover (e.g., tractor), as well as the width and position of the windrow which is to be picked up by the baler, it may be desirable to adjust the width of the wheels to straddle and not compact the windrow. However, if the wheels are placed at a wide wheel stance during operation, it may be necessary to narrow the wheel stance when driving from one field to the other, or on the road, or if the windrow width is different from one field to the other, or for transportation on a truck such that the wheels fit the dimensions of the truck. It may therefore be desirable to provide the baler with an undercarriage allowing the wheel stance to be easily widened or narrowed.

A problem with a baler having an adjustable wheel stance is that when the baler is set with a wide wheel stance, the weight of the baler may slightly bow the axles downward. The axle bowing may be further exaggerated when the baler is loaded with full bales, particularly in the case of a large square baler or large round baler. The wider the wheel stance, the more the axles tend to bow. Bowing of the axles in turn causes the wheels to tip in at the top, which results in excessive wear of the tires.

What is needed in the art is an agricultural machine having an undercarriage allowing the wheels to be easily configured for a wide or narrow wheel stance, while at the same time accommodating a change in wheel angle which may occur as a result of the change in wheel stance.

SUMMARY OF THE INVENTION

The present invention provides an agricultural machine with an undercarriage having an adjustable wheel stance, and removable adjustment devices such as a shim, a wedge, an adjustment bolt, etc. which accommodate a change in wheel angle dependent on the selected wheel stance.

The invention in one form is directed to an undercarriage for an agricultural machine. The undercarriage includes a hollow axle, and a stub axle slidably received within the hollow axle. A lock arrangement locks a longitudinal position of the stub axle relative to the hollow axle. At least one adjustment device is positioned at an outboard end of the hollow axle to adjust the distance between the stub axle and the hollow axle.

Preferably, the adjustment devices are placed at the outboard end of the hollow axle, to adjust the distance between the stub axle and the hollow axle.

The invention in another form is directed to an agricultural machine, including a chassis and an undercarriage mounted to the chassis. The undercarriage includes a hollow axle, and a stub axle slidably received within the hollow axle. A lock arrangement locks a longitudinal position of the stub axle relative to the hollow axle. At least one adjustment device is positioned at an outboard end of the hollow axle to adjust the distance between the stub axle and the hollow axle.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
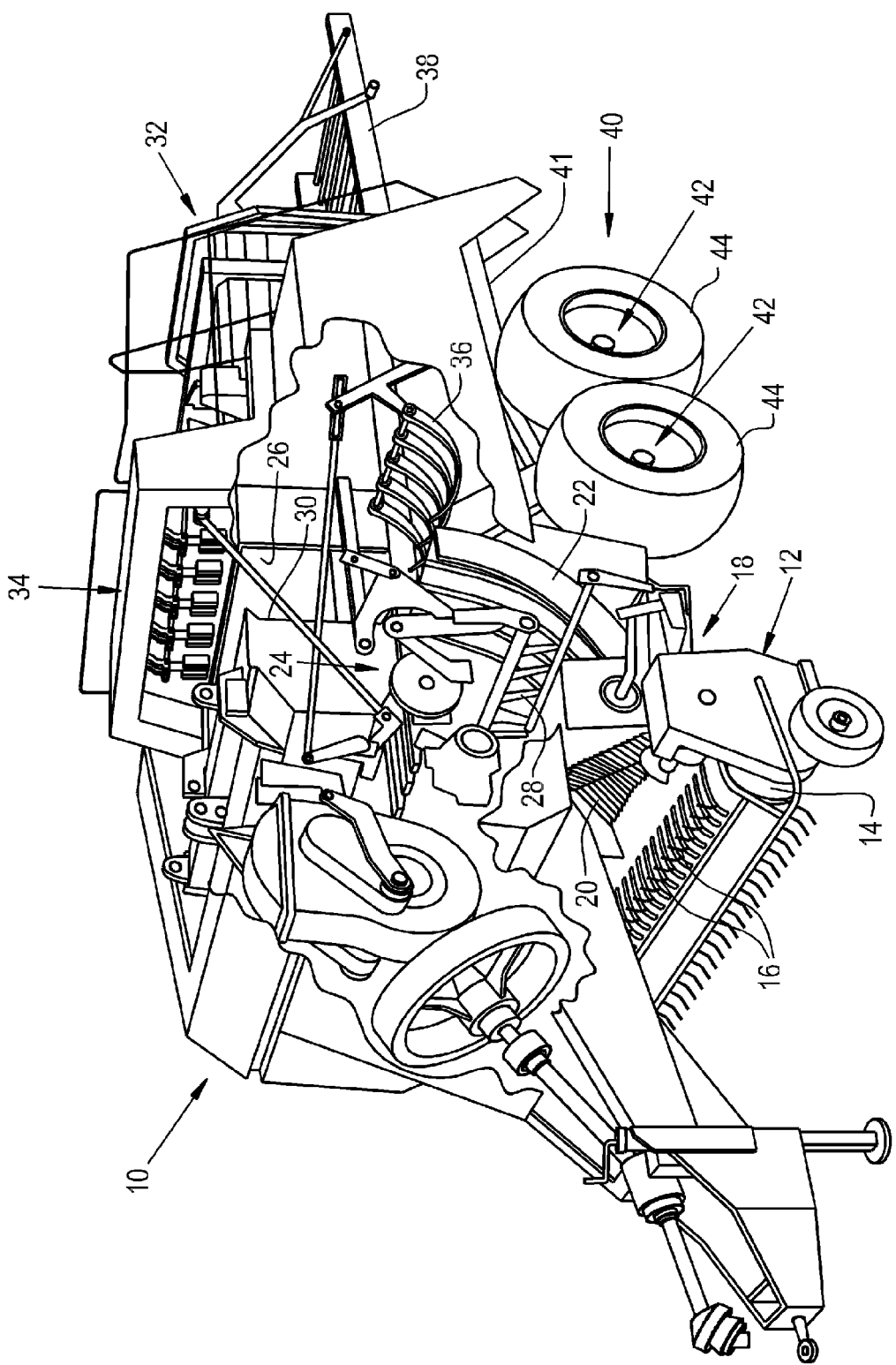
FIG. 1 is a perspective cutaway view showing the internal workings of a large square baler, including an undercarriage of the present invention.

Referring now to the drawings, and more particularly to FIG. 1, there is shown an embodiment of an agricultural machine in the form of a towed implement, specifically a large square baler 10. FIG. 1 is a perspective cutaway view showing the internal workings of the large square baler 10. However, the agricultural machine of the present invention could be in the form of a different type of machine, such as a round baler, a mower-conditioner, a gravity wagon, etc.

Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. Pre-compression chamber 22 and packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. The main bale chamber 26 and the plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Figure 2:
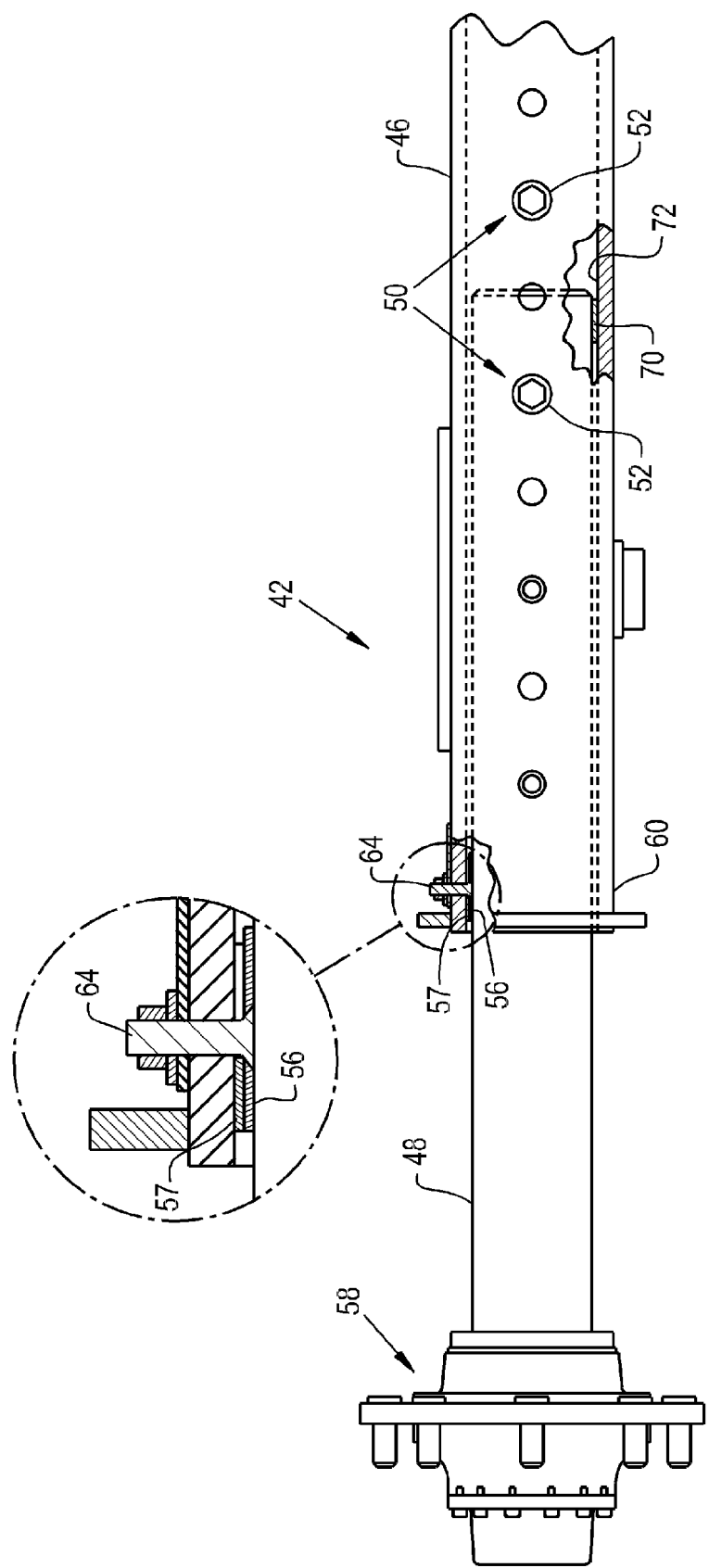
FIG. 2 is a fragmentary side view of an embodiment of an axle assembly used with the undercarriage of the present invention.
Figure 3:
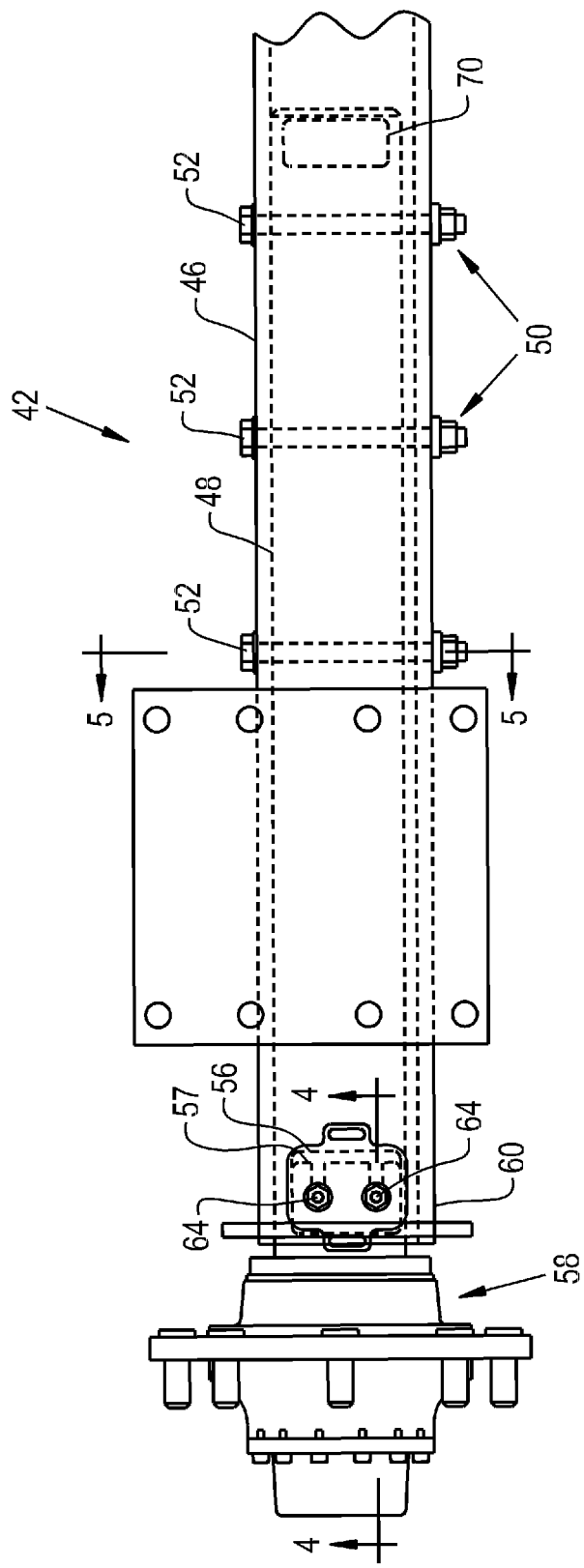
FIG. 3 is a fragmentary top view of the axle assembly shown in FIG. 2.

According to an aspect of the present invention, baler 10 also includes an undercarriage 40 mounted to a chassis 41. Undercarriage 40 includes one or multiple axle assemblies 42 (shown in greater detail in FIGS. 2 and 3) carrying tires 44. Each axle assembly 42 includes a hollow axle 46 and a stub axle 48 slidably received within the hollow axle 46. A lock arrangement 50 locks a longitudinal position of the stub axle 48 relative to the hollow axle 46. In the illustrated embodiment, the lock arrangement 50 includes a plurality of bolts 52 which extend through aligned bolt holes 54 formed in each of the hollow axle 46 and the stub axle 48. The bolt holes 54 formed in the stub axle 48 have a diameter which is larger than a diameter of a corresponding bolt 52 so as to allow a limited range of vertical motion of the stub axle 48 within hollow axle 46. Other types of lock arrangements are also possible, such as a stud at the top of the hollow axle which tightens against a selected depression in the top of the stub axle, a finger-type latch that latches over a selected stud extending from the side of the stub axle, etc.

Figure 5:
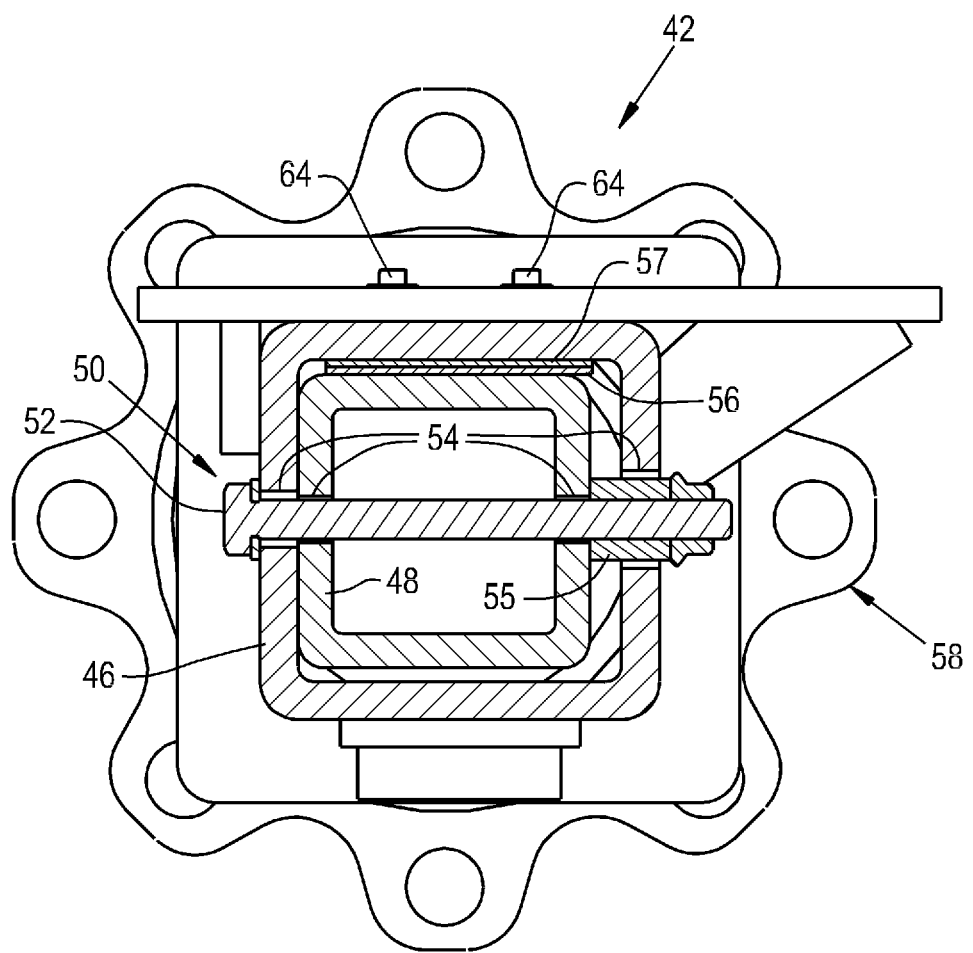
FIG. 5 is a sectional view of the axle assembly shown in FIGS. 2-4, taken along section line 5-5 in FIG. 3.
Figure 6:
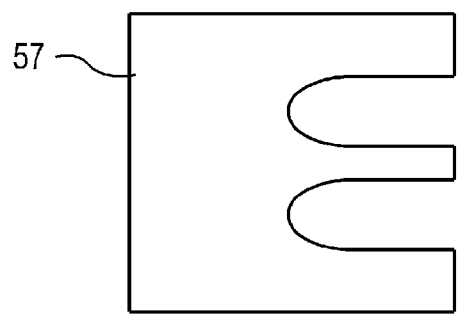
FIG. 6 is a top view of the shim shown in FIGS. 2-4.

As shown in FIG. 5, the stub axle 48 has a width in the horizontal direction which is less than the inside width of the hollow axle 46. This clearance distance is needed to allow easy installation of the stub axle inside the hollow axle 46, allow movement during the repositioning of the stub axle with relation to the hollow axle, and to allow water to drain from the space within the hollow axle 46. A bushing 55 may be used to bias the stub axle 48 to one side of the interior of the hollow axle 46.

A compensation plate 56 may be used to bias the stub axle 48 toward the bottom of the interior of the hollow axle 46 to compensate for the tolerance which is needed between the hollow axle 46 and the stub axle 48. The compensation plate 56 is installed before mounting the stub axle 48 inside the hollow axle 46. A pair of bolts 64 are positioned inside holes 68 in the compensation plate 56 and placed through the holes 66 of the hollow axle 46. The bolts 64 are then secured to the hollow axle such that the compensation plate 56 is now in place inside the hollow axle 46.

Figure 4:
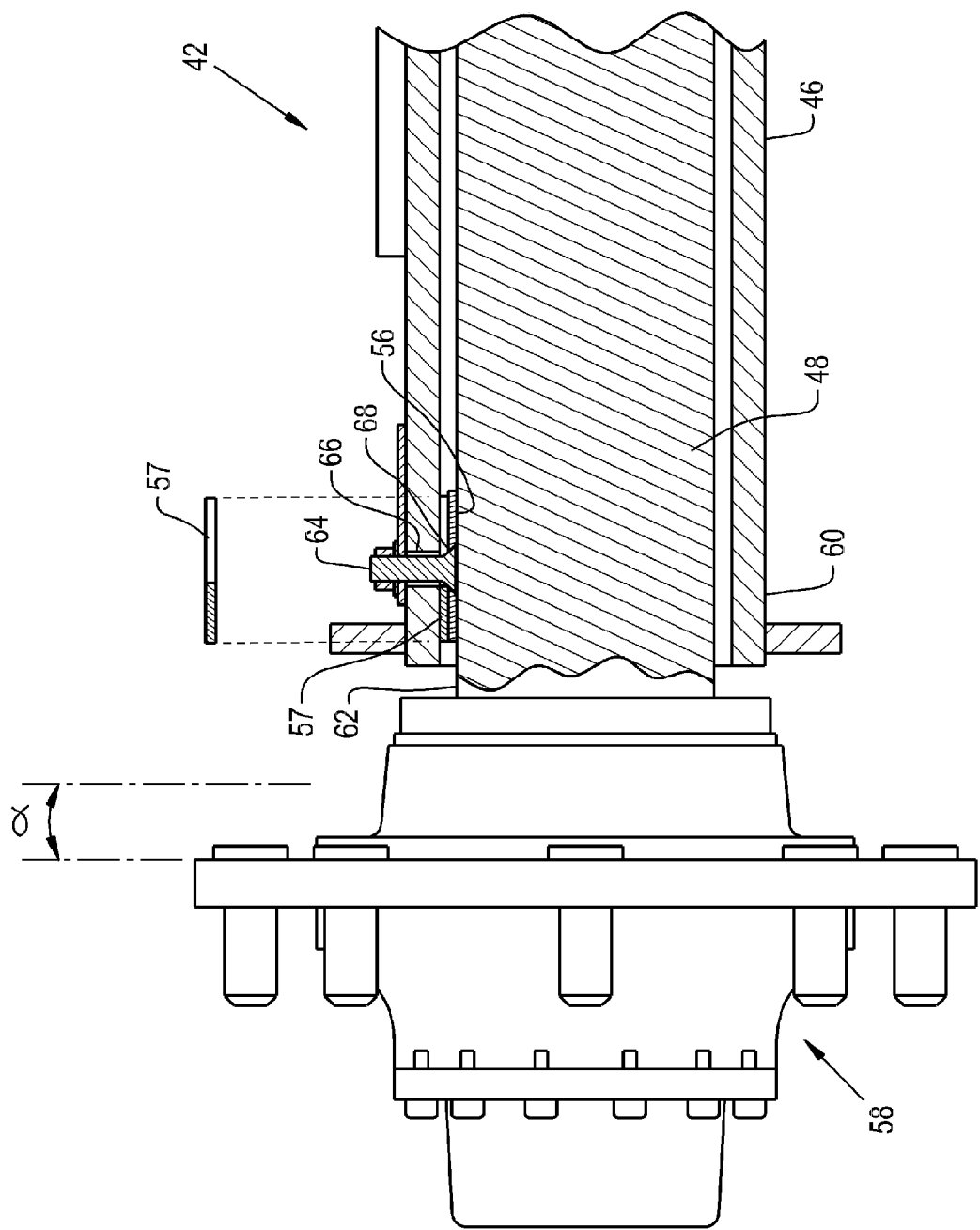
FIG. 4 is a fragmentary enlarged view of the axle assembly shown in FIGS. 2 and 3, taken along section line 4-4 in FIG. 3.

When axle assembly 42 is configured with a wide wheel stance (i.e., when the stub axle 48 is at an axially outer position within the hollow axle 46), the static and dynamic loads placed on the axle assembly 42 by the weight of the baler 10 as it moves across a field may cause the axle assembly 42 to bow or bend. Bending of the axle assembly 42 affects the camber angle of the wheels, which in turn may result in undue wear of the tires. Referring to FIG. 4, the camber angle $\alpha$ is the angle between the vertical axis of the wheel and the vertical axis of the vehicle (the camber angle $\alpha$ is shown with an angle of zero (0) in FIG. 4, but can have a positive or negative camber angle). Bending of the axle assembly 42 in a downward direction causes a negative camber angle to occur. A negative camber angle refers to an angle where the bottom of the wheel is farther away from the center of the vehicle than the top of the wheel. Generally speaking, camber angle changes of even slightly more than a ¼ of 1° can impact tire wear.

To accommodate bending of the axle assembly 42 and resultant negative camber angle, an adjustment device in the form of one or more shims 57 is used to tip the top of the wheel hub 58 in a laterally outward direction and thereby offset the negative camber angle. The amount of negative camber angle relates to the total width of the wheel stance and will differ depending on the selected wheel stance. When a specific wheel stance is chosen, the negative camber angle will need to be compensated by the adjustment device, such as shims Referring to FIG. 2, a single shim 57 is shown positioned between compensation plate 56 and hollow axle 46, at an outboard end 60 of the hollow axle 46 and at a top 62 of the stub axle 48. Shim 57 extends substantially the entire width of the top 62 of the stub axle 48, and is positioned to the outboard end 60 of the hollow axle 46 using a pair of bolts 64. By using these bolts 64, the shims 57 will not be able to slide more to the inside of the hollow axle 46 due to e.g., vibrations of the machine when working. Each bolt 64 extends through a corresponding hole 66 in hollow axle 46 and an opening formed in shim 57. The opening is designed as a slot which is open on one side of the shim, such that the shim can be placed in between the compensation plate 56 and the hollow axle 46 without the need to remove the bolts 64. Likewise, the openings in the compensation plate 56 also can be open on one side to allow installation of the compensation plate 56 after installing the stub axle 48 inside the hollow axle 46. Bolts 64 are configured as flathead bolts in the illustrated embodiment and terminate at the bottom surface of compensation plate 56 shim.

Figure 7:
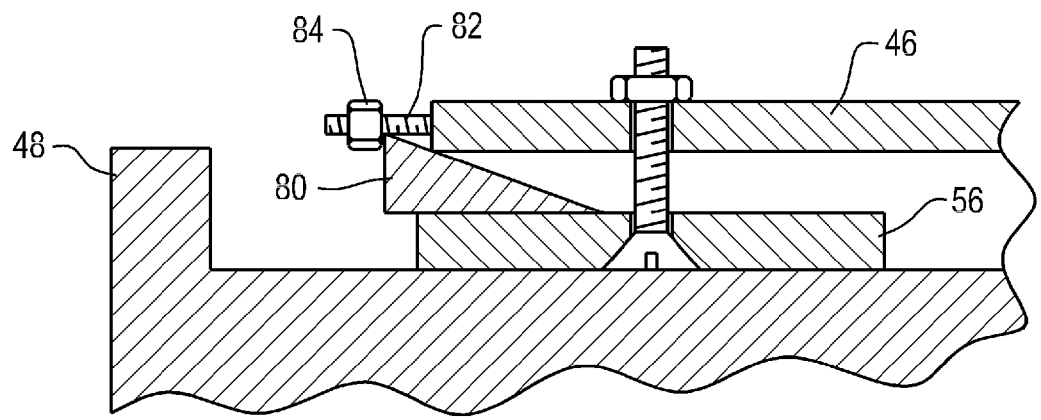
FIG. 7 is a side view of another embodiment of an adjustment device of the present invention, including a wedge.

Instead of using shims, a wedge 80 can be used (FIG. 7). The wedge 80 can likewise be inserted between the compensation plate 56 and the hollow axle 46. To secure the wedge 80 in place, a screw 82 can be inserted in the end of the hollow axle 46 and a nut 84 can be turned to contact the side of the wedge 80. Other securing devices are likewise possible. When the wedge 80 is used instead of the shims 57, the compensation plate 56 can also be eliminated if the wedge 80 is dimensioned appropriately.

Figure 8:
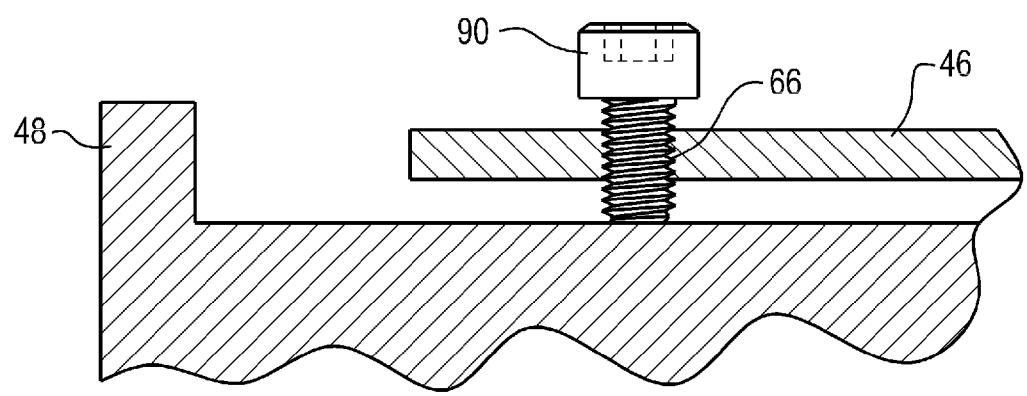
FIG. 8 is a side view of yet another embodiment of an adjustment device of the present invention, including an adjustment bolt.

Another possibility is to use an adjustment bolt 90 instead of the regular bolt 64 (FIG. 8). The adjustment bolt 90 has a threaded outer surface which mates with a female thread within the hole 66 of the hollow axle 46. By turning the adjustment bolt 90 more towards the center of the hollow axle 46, the end of the adjustment bolt 90 will push against the stub axle 48 and reposition it with relation to the hollow axle 46.

A plate 70 is permanently mounted to an interior, bottom surface 72 of hollow axle 46. The plate 70 assures that the shim 57 causes a change in the camber angle of the wheel hub 58, rather than just a translational movement of the stub axle 48 within the hollow axle 46. The plate 70 is preferably welded at a location away from the outboard end 60 of the hollow axle 46, corresponding to an anticipated widest wheel stance of axle assembly 42.

To install one or more of the shims 57, the hollow axle 46 is jacked up until the tire 44 is lifted from the ground. The bolts 52 are removed and the stub axle 48 is slid out of the hollow axle 46 till the desired width. The stub axle 48 with the wheel hub 58 will tilt towards the ground. The nuts of the bolts 64 are released to allow more space between the inner wall of the hollow axle 46 and the compensation plate 56. One or more of the shims 57 of a desired thickness are placed within the hollow axle 46 at the outboard end 60 thereof. The two flathead bolts 64 are tightened again with the nuts at the top side of outboard end 60. Spare shims 57 may be stored under the nuts at the top side of the outboard end 60, if desired. This same installation procedure may be used for each tire 44.

When the wheel stance is at a desired width, but excessive wear is noticed during operation, the above installation method can partially be used. In this case the hollow axle 46 is jacked up until the tire 44 is lifted from the ground. The stub axle 48 with the wheel hub 58 will tilt towards the ground. The nuts of the bolts 64 are released to allow more space between the inner wall of the hollow axle 46 and the compensation plate 56. One or more of the shims 57 of a desired thickness are placed within the hollow axle 46 at the outboard end 60 thereof. The two flathead bolts 64 are tightened again with the nuts at the top side of outboard end 60.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An undercarriage for an agricultural machine, said undercarriage comprising:
    a hollow axle having an outboard end and an inboard end;
    a stub axle slidably received within said hollow axle and configured for extending to an extended position which determines an extended wheel stance of the undercarriage;
    a lock arrangement for locking a longitudinal position of said stub axle relative to said hollow axle;
    a plate permanently mounted to an interior, bottom surface of said hollow axle and located at a distance away from the outboard end of said hollow axle which corresponds to said extended wheel stance, and proximate to the inboard end of the stub axle; and
    at least one adjustment device positioned at a top face of said stub axle and at the outboard end of said hollow axle to adjust a distance between said stub axle and said hollow axle such that said stub axle tilts about said plate.

2. The undercarriage according to claim 1, wherein the adjustment device is positioned between said stub axle and said hollow axle.

3. The undercarriage according to claim 1, wherein said at least one adjustment device is at least one shim, and further including at least one bolt, each said bolt extending through a hole in said outboard end of said hollow axle and an aligned opening in said at least one shim.

4. The undercarriage according to claim 3, wherein each said bolt is a flat head bolt.

5. The undercarriage according to claim 3, wherein said at least one bolt comprises two bolts.

6. The undercarriage according to claim 3, wherein each said opening is a slot extending from an edge of said at least one shim.

7. The undercarriage according to claim 3, wherein said at least one shim comprises a plurality of shims each having said aligned opening.

8. The undercarriage according to claim 1, wherein said lock arrangement includes at least one bolt extending through aligned bolt holes formed in each of said hollow axle and said stub axle.

9. The undercarriage according to claim 8, wherein said bolt holes are horizontal bolt holes, said bolt holes having a diameter which is larger than a corresponding said bolt so as to allow vertical shimming of said stub axle within said hollow axle.

10. The undercarriage according to claim 8, wherein said at least one bolt comprises a plurality of bolts.

11. An agricultural machine, comprising:
    a chassis; and
    an undercarriage mounted to said chassis, said undercarriage including:
        a hollow axle having an outboard end and an inboard end;
        a stub axle slidably received within said hollow axle and configured for extending to an extended position which determines an extended wheel stance of the undercarriage;
        a lock arrangement for locking a longitudinal position of said stub axle relative to said hollow axle; and
        a plate permanently mounted to an interior, bottom surface of said hollow axle and located at a distance away from the outboard end of said hollow axle which corresponds to said extended wheel stance, and proximate to the inboard end of the stub axle; and
    at least one adjustment device positioned at a top face of said stub axle and at the outboard end of said hollow axle to adjust a distance between said stub axle and said hollow axle such that said stub axle tilts about said plate.

12. The undercarriage of claim 11, wherein the adjustment device to adjust the distance between said stub axle and said hollow axle is positioned between said stub axle and said hollow axle.

13. The undercarriage of claim 11, wherein said at least one adjustment device is at least one shim, and further including at least one bolt, each said bolt extending through a hole in said outboard end of said hollow axle and an aligned opening in said at least one shim.

14. The undercarriage of claim 13, wherein each said bolt is a flat head bolt.

15. The undercarriage of claim 13, wherein each said opening is a slot extending from an edge of said at least one shim.

16. The undercarriage of claim 11, wherein said lock arrangement includes at least one bolt extending through aligned horizontal bolt holes formed in each of said hollow axle and said stub axle, said bolt holes having a diameter which is larger than a corresponding said bolt so as to allow vertical shimming of said stub axle within said hollow axle.

17. The undercarriage of claim 11, wherein said agricultural machine is a towed implement.

18. The undercarriage of claim 11, wherein said agricultural machine is a large square baler.

19. A method of adjusting an angular orientation of a wheel on an agricultural machine, comprising the steps of:
providing an undercarriage configured for mounting to the agricultural machine, said undercarriage including a hollow axle having an outboard end and an inboard end, a stub axle slidably received within said hollow axle and configured for extending to an extended position which determines an extended wheel stance of the undercarriage, a lock arrangement for locking a longitudinal position of said stub axle relative to said hollow axle, and a plate permanently mounted to an interior, bottom surface of said hollow axle and located at a distance away from the outboard end of said hollow axle which corresponds to said extended wheel stance, and proximate to the inboard end of the stub axle;
sliding the stub axle within the hollow axle to a desired wheel stance;
adjusting a longitudinal spacing between the stub axle and the hollow axle;
adjusting a lateral spacing between the stub axle and the hollow axle with an adjustment device located at a top face of said stub axle and at the outboard end of the hollow axle such that said stub axle tilts about said plate and an angle of said stub axle is adjusted to adjust said angular orientation of the wheel; and
fixing the stub axle relative to the hollow axle at the adjusted longitudinal spacing by locking the longitudinal position of the stub axle relative to the hollow axle, using the lock arrangement, said lock arrangement includes at least one bolt extending through aligned holes in each of the hollow axle and the stub axle.

20. The method of claim 19, including the step of jacking up the hollow axle until the wheel is off the ground, prior to the sliding step.

21. The method of claim 19, wherein said adjusting step includes a sub-step of inserting at least one shim between said hollow axle and said stub axle, and wherein said fixing step includes the sub-step of bolting the at least one shim to the hollow axle.

* * * * *